Patented Nov. 13, 1934

1,980,927

UNITED STATES PATENT OFFICE 1,980,927

BONDING COMPOSITION OF SOLDER AND FLUX AND ART OF MAKING THE SAME

Arthur L. Parker, Cleveland, Ohio

No Drawing. Application June 16, 1933,
Serial No. 676,209

15 Claims. (Cl. 148—24)

The present invention relates to the production of a coherent mass of solder and flux which may be handled and employed like ordinary solder, and to the art of producing such a mass.

One of the features of the present invention is the provision of a porous homogeneous mass of coalesced solder particles which have been sintered or locally united together, with flux contained in the pores of this mass.

Another feature of the present invention is the provision of such a mass in the form of an extruded bar or wire of uniform cross section or in the form of a sheet; and in each instance each portion of the mass has therein both solder and flux.

A further feature of the present invention is a method of forming such a mass by the intimate mixing of finely divided solder and flux, and heating and compressing the same to effect the sintering or local uniting, so that the solder particles coalesce in the presence of the flux, and the heating and compressing operates to produce a mass of great solidity, and in which the flux is intimately and uniformly distributed throughout, so that even minute pores of the mass contain individually the requisite quantity of the flux for the proper joining of the solder to the surface which is to receive the same.

Still another feature of the present invention is a method of producing such a mass by heating and compressing a mixture of solder particles and flux so that the sintering or local union occurs, and employing the heat and pressure to effect an extrusion of the sintered mass in the form of a bar or wire.

A still further feature of the invention is a method of manufacture of such an article according to which solder particles are heated under pressure to effect the sintering or local uniting, and the sintered product is then quenched in a bath of flux, where the flux operated to reduce the temperature of the mass prior to a general fusion, and at the same time permeates into and impregnates the porous mass whereby a composite solder and flux product results.

With these and other objects in view, as will appear in the course of the following specification and claims, the invention may be more clearly described, in illustrative examples, as follows:

The invention is applicable to various materials now employed as solders, i. e. to materials which by reason of fusion at an elevated temperature are caused to adhere to or coalesce with a surface for the purpose of coating the same, and generally for the purpose of uniting two such surfaces together and to close any crevice or gap existing therebetween; being operative in the presence of an agent known commonly as a flux and serving for facilitating such adhesion by preventing the access of air, for example, to the surface while being heated, and usually also for the purpose of preparing or cleaning the surface preparatory to the reception of the solder. To this end, the flux is of such physical characteristics with respect to the particular solder that it attains a fluid condition prior to the melting of the solder.

The invention is therefore applicable to the usual soft solders such as the well known "half-and-half" alloy of tin and lead, to the higher melting solders employed in brazing, and to the solders which are operative only at high temperatures, such as the silver solder employed in jewelry work and for joining band saws, etc. These illustrative examples of the employment of such solders are merely set forth to indicate the broad fields in which the present invention may be employed.

Example 1

An ordinary "half-and-half" solder is reduced to fine particles of powder by an appropriate means. In practice, this may be accomplished by grinding, by electrolysis, or by spraying at high pressure. The particles thus produced are of irregular size and shape, but preferably are all fine enough to pass through a 100 or 200 mesh screen, for example. A suitable flux, such as rosin, is likewise reduced to a powder and intimately mixed with the solder particles. A die is prepared, comprising a matrix and a plunger, and immersed in an oil bath heated to and maintained at a temperature somewhat less than the fusing point of the solder. The mixture of solder and flux particles are introduced into the matrix and subjected to heavy pressure by the die. It is preferred that the temperature be such as to liquefy the flux. As the pressure is increased, the solder particles are brought closer and closer together, and by the co-action of the temperature and pressure, a sintering or local uniting of the particles occurs at their points of contact, but without substantial fusion of the major portion of each minute particle of solder. Further, by employing suitably high pressures, the necessary temperature and pressure effects may be produced entirely thereby, without a heated oil bath, owing to "regelation" effects. This sintering occurs in the presence of the flux, which facilitates the operation, and which continues to fill all the pores or cavities remaining in the mass. This compression operation is terminated before the entire fusion of the solder occurs, and hence the resultant mass is a sintered product in which the individual solder particles have coalesced to produce a spongelike porous structure with minute uniformly distributed pores or cavities, each containing flux. The homogeneous mass is then cooled and may be used as a pellet or cake, or may be broken into portions, each of which contains the quantity of flux requisite for the proper employment of the correspondingly contained quantity of solder, or may be rolled into sheets or flakes.

*Example 2*

The operation in general may be the same as in Example 1, but the matrix is provided with an opening through which the sintering mass is caused to extrude as the pressure is raised. The resistance to extrusion permits the development of a sufficient pressure for the proper sintering of the parts of the mass, and upon release from the extrusion orifice, the mass is reduced in temperature and brought to solid form. The extruded mass is of uniform cross section and constitutes a bar or wire of extruded solder and flux product competent for direct use in bonding upon the application of the requisite heat.

*Example 3*

A silver solder is reduced to a fine powder, and is compressed highly in a matrix while being subjected to a temperature which produces a sintering or local uniting of its particles in the manner described generally above. This sintered product is then quenched in a bath of molten borax so that its temperature is immediately reduced below the fusion point, and whereby the borax penetrates into and effects an impregnation of the sintered product throughout its structure.

*Example 4*

Solder particles of powdery size are impregnated with flux particles, and the mixture is subjected to pressure whereby to produce pellets in which the flux operates substantially as a binder to hold the particles together. These pellets are then introduced into an extrusion mechanism and are subjected simultaneously to a greater pressure and heating so that the aforesaid sintering occurs and an extruded bar or wire is produced. This form of procedure is desirable as it separates the mixing phase of the operation from the sintering and extrusion phases, and assures that the uniformity of distribution of flux and solder is maintained, without danger of separation of these parts by reason of different specific gravities, while introducing them into the extrusion mechanism.

It is obvious that the procedures of the above examples are applicable with various types of solders and various types of fluxes. In each case the result is a homogeneous mass of coalesced solder particles which are sintered or locally united together, this mass having a great number of fine pores or cavities throughout its structure which contain the flux requisite for the employment of the solder. The mass is hard, bendable as it is not exceedingly brittle; it breaks with a fracture corresponding to the breaking of a metal bar, and when employed does not fracture or break away in use. It has a considerable mechanical strength, and can be employed by unskilled persons with great success. It is free of the usual difficulties of cored solder wire, as the flux does not melt out and become dissipated prior to the melting of the solder itself when employed in a normal manner. A characteristic of the material, as revealed by specimens prepared, is that the outer surface is of solder alone, which protects and contains all the flux cells, so that a solder wire of the present material has substantially the same external appearance as a solid or cored solder wire of presently known type.

It has been found possible, in producing the sintering of the solder, to employ a lesser temperature than the normal melting point of the solder, since the sintering is produced under high pressure and a phenomenon comparable to the "regelation" of ice or other materials occurs, so that the fusion occurs substantially only at the points of contact, and the intimate union at these points is produced without a general fusion of the entire mass.

It is obvious that the invention is not limited solely to the examples of practicing the method set forth, but that it is applicable in many ways within the scope of the appended claims.

Having thus described the invention, what I claim as new and desire to secure by Letters Patent, is:

1. A solder bonding product comprising a sintered porous structure of locally united particles of solder with cavities therebetween, and flux uniformly distributed in said cavities.

2. As an article of manufacture, a coalesced sintered mass of locally united solder particles, said mass constituting a homogeneous sponge having minute pores throughout its structure, and flux in said pores.

3. As an article of manufacture, a coalesced sintered mass of solder particles, said mass constituting a homogeneous sponge having minute uniformly distributed pores throughout its structure, and flux filling said pores.

4. As an article of manufacture, a coherent bar or wire of substantially uniform cross-section and comprising a coalesced sintered mass of locally united solder particles, said mass constituting a homogeneous sponge having minute uniformly distributed pores throughout its structure, and flux filling said pores.

5. The method of preparing a solder and flux composition which comprises mixing solder powder and flux, and subjecting the mixture to the combined action of heat and pressure for effecting a sintering and local union of the solder particles in the presence of the flux and without producing a general fusion of the solder.

6. The method of preparing a solder and flux composition, which comprises mixing solder powder and flux, heating under pressure for effecting a sintering or local union of the solder particles in the presence of the flux, and extruding the sintered product under the heat and pressure employed for effecting the sintering.

7. The method of preparing a solder and flux composition, which comprises heating solder powder under pressure for effecting a sintering or local union of the solder particles, and quenching the hot product in a bath of flux to effect a cooling and impregnation of the mass with the flux.

8. The method of preparing a solder and flux composition, which comprises compressing solder powder into a coherent mass, heating the mass for effecting a sintering or local union of the solder particles, and quenching the hot product in a bath of flux to effect a cooling and impregnation of the mass with the flux.

9. The method of preparing a solder and flux composition, which comprises compressing solder powder and flux into a coherent mass, heating for effecting a sintering or local union of the solder particles in the presence of the flux, and extruding the sintered product under the heat and pressure employed for effecting the sintering.

10. The method of making a coherent mass of solder and flux, which includes compressing fine solder particles together in the presence of flux and at a temperature for effecting a sintering or local union of the solder particles without producing a general fusion of the solder, and cooling the product to retain the flux in the pores thereof.

11. The method of making a coherent mass of solder and flux which includes mixing fine particles of solder with the flux, heating fine solder particles in the presence of the flux until sintering or local union of the particles occurs without a general fusion of the solder so that pores exist in the mass and the flux occupies the pores within the sintered mass of solder, and extruding the sintered product under the heat and pressure employed for effecting the sintering.

12. The method of making a coherent mass of solder and flux which comprises heating fine solder particles until sintering or local uniting of the particles occurs, and quenching the sintered product in a bath of flux.

13. The method of producing a solder bonding product which comprises reducing solder to fine particles, reducing flux to fine particles, uniformly mixing said solder and flux particles, and subjecting the mixture to the combined action of heat and pressure for sintering together the particles of solder in the presence of the flux for forming a coalesced mass of solder having minute cavities throughout its structure, said cavities retaining flux therein, the temperature of heating being insufficient for producing a general fusion of the solder.

14. As an article of manufacture, a coalesced sintered mass of locally united solder particles, said mass constituting a homogeneous sponge having minute pores throughout its structure, and flux in said pores, said mass being covered by an external non-porous jacket of solder in sintering union with contacting solder particles of the internal mass.

15. A solder bonding product comprising an external jacket of solder and a sintered porous internal structure of locally united particles of solder with cavities therebetween, and flux in said cavities.

ARTHUR L. PARKER.